(12) United States Patent
Oita et al.

(10) Patent No.: US 9,033,845 B2
(45) Date of Patent: May 19, 2015

(54) VEHICULAR AUTOMATIC TRANSMISSION

(71) Applicants: Shinji Oita, Toyota (JP); Masaru Morise, Aichi-ken (JP); Satoru Kasuya, Aichi-ken (JP); Nobukazu Ike, Kariya (JP); Hiroshi Katou, Kariya (JP); Toru Souda, Okazaki (JP); Masahiro Otake, Nishio (JP)

(72) Inventors: Shinji Oita, Toyota (JP); Masaru Morise, Aichi-ken (JP); Satoru Kasuya, Aichi-ken (JP); Nobukazu Ike, Kariya (JP); Hiroshi Katou, Kariya (JP); Toru Souda, Okazaki (JP); Masahiro Otake, Nishio (JP)

(73) Assignees: TOYOTA JIDOSHA KABUSHIKI KAISHA, Aichi-ken (JP); AISIN AW CO., LTD., Aichi-ken (JP)

( * ) Notice: Subject to any disclaimer, the term of this patent is extended or adjusted under 35 U.S.C. 154(b) by 140 days.

(21) Appl. No.: 13/740,560

(22) Filed: Jan. 14, 2013

(65) Prior Publication Data

US 2013/0184117 A1    Jul. 18, 2013

(30) Foreign Application Priority Data

Jan. 18, 2012 (JP) ................................. 2012-008498

(51) Int. Cl.
*F16H 3/62* (2006.01)
*F16H 3/66* (2006.01)

(52) U.S. Cl.
CPC .. *F16H 3/62* (2013.01); *F16H 3/66* (2013.01); *F16H 2200/006* (2013.01); *F16H 2200/0086* (2013.01); *F16H 2200/201* (2013.01); *F16H 2200/2046* (2013.01)

(58) Field of Classification Search
USPC ........................................ 475/271, 275, 286
See application file for complete search history.

(56) References Cited

U.S. PATENT DOCUMENTS

| 8,083,632 B2 * | 12/2011 | Wittkopp ...................... 475/284 |
| 8,202,192 B2 | 6/2012 | Iizuka et al. |
| 2007/0225115 A1 | 9/2007 | Nakajima et al. |
| 2010/0048345 A1 * | 2/2010 | Boss et al. ..................... 475/275 |

FOREIGN PATENT DOCUMENTS

| JP | 57-1703 B2 | 1/1982 |
| JP | 08-247234 A | 9/1996 |
| JP | 09-126282 A | 5/1997 |
| JP | 2007-263135 A | 10/2007 |
| JP | 2009-144769 A | 7/2009 |
| JP | 2011-017373 A | 1/2011 |
| JP | 2011-033137 A | 2/2011 |

OTHER PUBLICATIONS

Partial translation of communication dated Jan. 7, 2014, issued by the Japanese Patent Office in counterpart Japanese application No. 2012-008498.

* cited by examiner

*Primary Examiner* — Edwin A Young
(74) *Attorney, Agent, or Firm* — Sughrue Mion, PLLC

(57) ABSTRACT

A vehicular automatic transmission includes three single pinion planetary gear sets and a plurality of engagement elements. A plurality of gears is selectively established by three of the plurality of engagement elements being engaged and three of the plurality of engagement elements being released. One of the plurality of engagement elements is a dedicated reverse engagement element that is engaged when a reverse gear is established and is released when a forward gear is established.

3 Claims, 5 Drawing Sheets

FIG. 2

| | C1 | C2 | C3 | C4 | B1 | B2 | GEAR RATIO | STEP |
|---|---|---|---|---|---|---|---|---|
| 1st | | ○ | | | | ○ | 5.395 | 1.739 |
| 2nd | | ○ | ○ | | | ○ | 3.102 | 1.427 |
| 3rd | | ○ | ○ | ○ | | | 2.174 | 1.338 |
| 4th | ○ | ○ | | ○ | | | 1.624 | 1.252 |
| 5th | ○ | ○ | ○ | ○ | | | 1.298 | 1.298 |
| 6th | ○ | | ○ | ○ | | | 1.000 | 1.203 |
| 7th | ○ | | | ○ | | ○ | 0.831 | 1.114 |
| 8th | ○ | | | | | ○ | 0.746 | — |
| Rev1 | | | | ○ | ○ | ○ | −7.298 | SPREAD |
| Rev2 | | | ○ | ○ | ○ | | −2.941 | 7.229 |

US 9,033,845 B2

VEHICULAR AUTOMATIC TRANSMISSION

INCORPORATION BY REFERENCE

The disclosure of Japanese Patent Application No. 2012-008498 filed on Jan. 18, 2012 including the specification, drawings and abstract is incorporated herein by reference in its entirety.

BACKGROUND OF THE INVENTION

1. Field of the Invention

The invention relates to a vehicular automatic transmission. More particularly, the invention relates to an improvement for increasing the degree of freedom in structure of a hydraulic circuit and the like.

2. Description of Related Art

A stepped automatic transmission that is provided with a plurality of engagement elements, and selectively establishes a plurality of speeds according to an engagement/release combination of the plurality of engagement elements is widely used in a variety of types of vehicles. For the engagement elements, hydraulic friction engagement devices that are switched between an engaged state and released state by hydraulic pressure, for example, are used and a variety of structures have been proposed. For example, an automatic transmission described in Japanese Patent Application Publication No. 2011-017373 (JP 2011-017373 A) includes three planetary gear sets and six engagement elements, and is configured such that eight forward speeds (i.e., first speed to eighth speed) and one reverse speed are able to be selectively established by engaging any three of the six engagement elements and releasing the other three engagement elements.

SUMMARY OF THE INVENTION

With the related art described above, in a structure provided with the plurality of engagement elements that are hydraulic friction engagement devices, for example, the degree of freedom in the structure of a hydraulic circuit and the like that generates hydraulic pressure to control engagement and release of these engagement elements is limited. This problem was newly discovered through intense study by the inventors to improve a vehicular automatic transmission. The invention thus provides a vehicular automatic transmission with a high degree of freedom in structure.

An aspect of the invention relates to a vehicular automatic transmission that includes three single pinion planetary gear sets, and a plurality of engagement elements, a plurality of gears being selectively established by three of the plurality of engagement elements being engaged and three of the plurality of engagement elements being released, and one of the plurality of engagement elements being a dedicated reverse engagement element that is engaged when a reverse gear is established and is released when a forward gear is established.

In this way, according to this aspect of the invention, one of the plurality of engagement elements is a dedicated reverse engagement element that is engaged when a reverse gear is established, and is released when a forward gear is established. Providing an engagement element that does not contribute to a shift related to a forward gear in this way obviates the need for a structure for realizing slip control or the like to partially engage the engagement element, and thus enables the structure of the hydraulic circuit to be simplified. That is, a vehicle automatic transmission having a high degree of freedom in structure is able to be provided.

In this aspect of the invention, the dedicated reverse engagement element may be a mesh engagement element. According to this structure, drag loss when an engagement element is released is able to be better suppressed.

In the structure described above, the dedicated reverse engagement element may be mechanically connected to a manual mechanism, and may be configured to switch between an engaged state and a released state in conjunction with the manual mechanism being driven.

In the structure described above, the plurality of engagement elements may be four clutch elements and two brake elements. Having fewer brake elements than clutch elements in this way enables drag loss when an engagement element is released to be even better suppressed.

In this structure, the three single pinion planetary gear sets may be a first planetary gear set, a second planetary gear set, and a third planetary gear set; the four clutch elements may be a first clutch element, a second clutch element, a third clutch element, and a fourth clutch element; the two brake elements may be a first brake element and a second brake element; a carrier of the first planetary gear set and a carrier of the third planetary gear set may be connected together; the first clutch element may selectively connect the carrier of the first planetary gear set and the carrier of the third planetary gear set to an input member; the second clutch element may selectively connect a ring gear of the first planetary gear set to a carrier of the second planetary gear set; the third clutch element may selectively connect a ring gear of the second planetary gear set to a sun gear of the third planetary gear set; the fourth clutch element may selectively connect the carrier of the second planetary gear set to the sun gear of the third planetary gear set; the first brake element may selectively connect the carrier of the first planetary gear set and the carrier of the third planetary gear set to a non-rotating member; the second brake element may selectively connect the ring gear of the second planetary gear set to the non-rotating member; a sun gear of the second planetary gear set may be connected to the input member; a sun gear of the first planetary gear set may be connected to the non-rotating member; and a ring gear of the third planetary gear set may be connected to an output member. According to this structure, a vehicle automatic transmission of a practical mode having a high degree of freedom in structure is able to be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is an operation table showing the operating states of engagement elements when selectively establishing a plurality of speeds in the automatic transmission shown in FIG. 1;

DETAILED DESCRIPTION OF EMBODIMENTS

Figure 1:
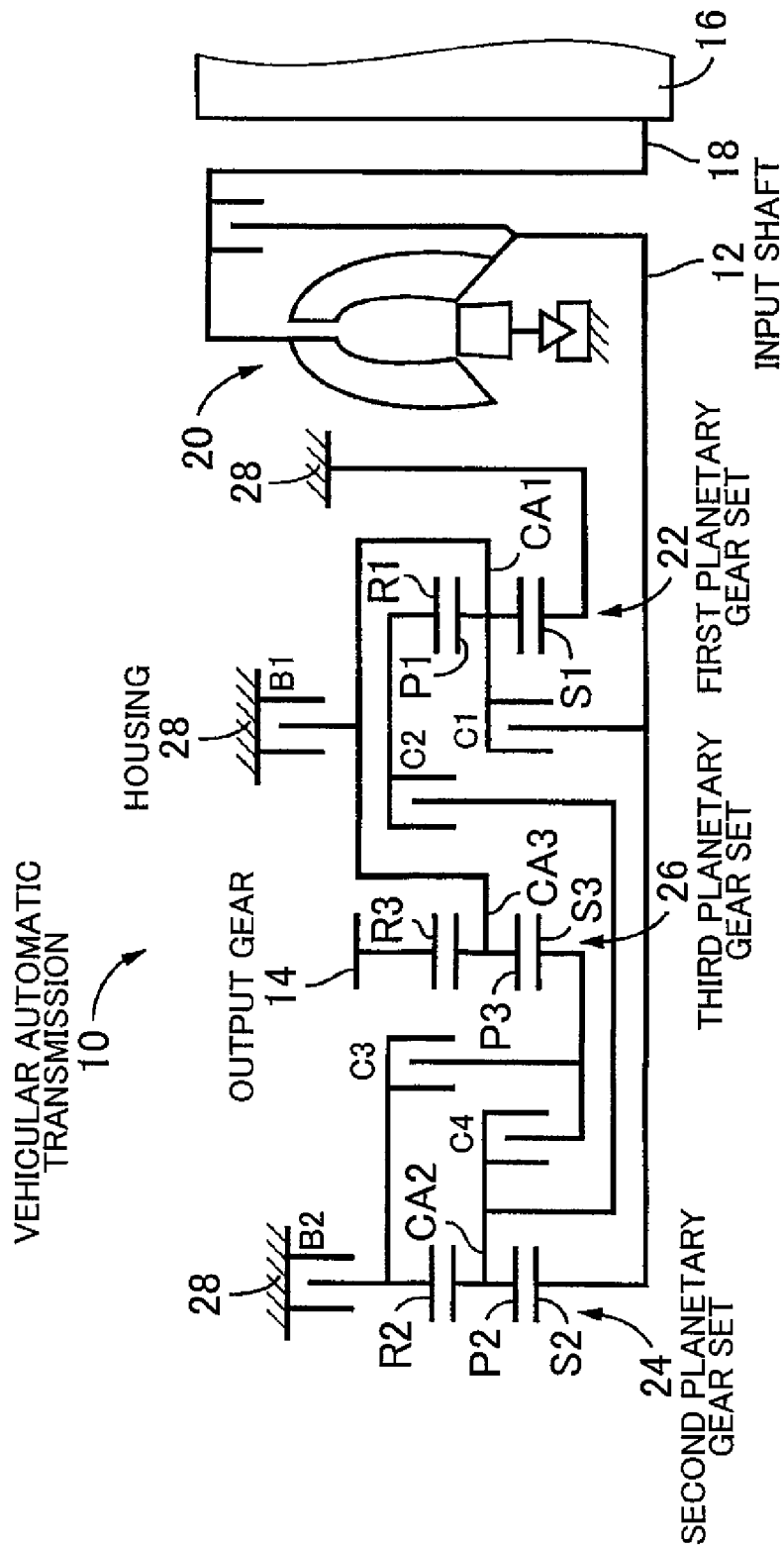
FIG. 1 is a skeleton view of the structure of a vehicular automatic transmission according to a first example embodiment of the invention.

The vehicular automatic transmission of the invention is preferably a stepped automatic transmission provided in a power transmitting path between a torque converter that is connected to an engine that serves as a driving force source for running, and driving wheels. The engagement elements are preferably hydraulic friction engagement devices such as wet type multiple disc clutches in which a plurality of overlapping friction plates are pressed together by a hydraulic actuator. The engagement and release of these engagement elements are controlled according to hydraulic pressure supplied by a hydraulic control circuit. The engagement elements do not necessarily have to be wet type clutches. That is, the engagement elements may also be dry type clutches or mesh clutches.

The mesh engagement element is preferably a mesh engagement device (a dog clutch) that includes one pair of engaging members having pawl portions that are able to be engaged together, corresponding to a pair of members to be engaged (in which relative rotation is prohibited) and released (in which relative rotation is allowed), and in which the engagement state is switched by this pair of engaging members being moved relatively according to hydraulic pressure supplied from a hydraulic circuit. Preferably, the mesh engagement element is an engagement device that is provided with a cylinder, a piston reciprocatably provided inside the cylinder, and a spring that urges the piston to disengage the pawl portions, in which when hydraulic pressure is not being supplied, the engagement device is released by the piston being moved by the urging force of the spring in the direction to disengage the pawl portions, and when hydraulic pressure is being supplied, the engagement device is engaged by the piston being moved against the urging force of the spring in the direction to engage the pawl portions.

The dedicated reverse engagement element is preferably a brake element that is provided between a non-rotating member of the automatic transmission and a rotating element provided rotatable with respect to the non-rotating member, and that selectively connects the rotating element to the non-rotating member. The dedicated reverse engagement element is preferably a clutch element that is provided between a plurality of rotating elements that are rotatably provided with respect to the non-rotating member, and that selectively connects the plurality of rotating elements together.

The manual mechanism is preferably a structure such as a manual shaft that is driven according to a shift operation of a shift operating device provided near a driver's seat, or a manual valve in which a valve body position is switched in response to this manual shaft being driven. The manual mechanism is preferably configured such that the dedicated reverse engagement element engages when an operation for establishing reverse running is established in the manual mechanism.

Hereinafter, example embodiments of the invention will be described in detail with reference to the accompanying drawings.

FIG. 1 is a skeleton view of the structure of a vehicular automatic transmission. 10 according to a first example embodiment of the invention. In the drawings referred to in the description below, the scale ratios and the like of portions are not always accurately depicted. As shown in FIG. 1, the automatic transmission 10 of this example embodiment is a transverse mounted automatic transmission preferably used in an FF (front engine front wheel drive) vehicle or the like, for example. This automatic transmission 10 changes the rate and/or direction of rotation of an input shaft 12 that is an input member (an input rotating element) and outputs the changed rotation from an output gear 14 that is an output member (an output rotating element). This input shaft 12 is connected to a turbine shaft of a torque converter 20. Driving force output from a crankshaft 18 of an engine 16 that is a driving force source for running is input to the input shaft 12 via the torque converter 20. The driving force output from the output gear 14 is transmitted to a pair of left and right driving wheels, not shown, via a differential gear unit and axles and the like, also not shown. The automatic transmission 10 is symmetrical with respect to a center line, so the half below the center line is omitted in FIG. 1. This is also true for each of the example embodiments below.

The automatic transmission 10 includes a single pinion first planetary gear set 22 having a predetermined gear ratio $\rho 1$ of approximately 0.675, for example, a single pinion second planetary gear set 24 having a predetermined gear ratio $\rho 2$ of approximately 0.675, for example, and a single pinion third planetary gear set 26 having a predetermined gear ratio $\rho 3$ of approximately 0.340, for example, all aligned on a common central axis inside a housing 28 that serves as a non-rotating member attached to a vehicle body. The gear ratios $\rho 1$ to $\rho 3$ are gear ratios when the number of teeth on a sun gear of each of the planetary gear sets is ZS and the number of teeth on a ring gear of each of the planetary gear sets is ZR, i.e., ZS/ZR. As shown in FIG. 1, in the automatic transmission 10, the first planetary gear set 22, the second planetary gear set 24, and the third planetary gear set 26 are arranged in the order of the first planetary gear set 22, the third planetary gear set 26, and the second planetary gear set 24 in the axial direction from the engine 16 side.

The first planetary gear set 22 includes, as rotating elements (i.e., rotating members), a sun gear S1, a plurality of pinion gears P1, a carrier CA1 that rotatably and revolvably supports these pinion gears P1, and a ring gear R1 that is in mesh with the sun gear S1 via the pinion gears P1. The second planetary gear set 24 includes, as rotating elements, a sun gear S2, a plurality of pinion gears P2, a carrier CA2 that rotatably and revolvably supports these pinion gears P2, and a ring gear R2 that is in mesh with the sun gear S2 via the pinion gears P2. The third planetary gear set 26 includes, as rotating elements, a sun gear S3, a plurality of pinion gears P3, a carrier CA3 that rotatably and revolvably supports these pinion gears P3, and a ring gear R3 that is in mesh with the sun gear S3 via the pinion gears P3.

In this automatic transmission 10, the sun gear S2 of the second planetary gear set 24 is connected to the input shaft 12 that is the input member. The sun gear S1 of the first planetary gear set 22 is connected to the housing 28 that is the non-rotating member. The carrier CA1 of the first planetary gear set 22 and the carrier CA3 of the third planetary gear set 26 are connected together. The ring gear R3 of the third planetary gear set 26 is connected to the output gear 14 that is the output member.

The automatic transmission 10 has four clutch elements and two brake elements, as a plurality of engagement elements for selectively establishing a plurality of speeds in the automatic transmission 10. That is, the automatic transmission 10 has a first clutch C1 corresponding to a first clutch element, a second clutch C2 corresponding to a second clutch element, a third clutch C3 corresponding to a third clutch element, a fourth clutch C4 corresponding to a fourth clutch element, a first brake B1 corresponding to a first brake element, and a second brake B2 corresponding to a second brake element (hereinafter, when not specified, these will simply be referred to as clutches C and brakes B. These clutches C and brakes B are preferably all hydraulic friction engagement devices that are engagement elements often used in vehicular automatic transmissions. For example, these clutches C and brakes B may be wet type multiple disc clutches and brakes in which a plurality of overlapping friction plates are pressed together by a hydraulic actuator. The engagement states of the clutches C and brakes B are preferably able to be switched by hydraulic pressure supplied according to energization/de-energization or current control of linear solenoid valves provided in a hydraulic circuit, not shown.

As shown in FIG. 1, in this automatic transmission 10, the first clutch C1 that selectively connects the carrier CA1 of the first planetary gear set 22 and the carrier CA3 of the third planetary gear set 26, that are connected together, to the input shaft 12 that is the input member is provided between these carriers CA1 (CA3) and the input shaft 12. The second clutch C2 that selectively connects the ring gear R1 of the first planetary gear set 22 to the carrier CA2 of the second planetary gear set 24 is provided between the ring gear R1 and the carrier CA2. The third clutch C3 that selectively connects the ring gear R2 of the second planetary gear set 24 to the sun gear S3 of the third planetary gear set 26 is provided between the ring gear R2 and the sun gear S3. The fourth clutch C4 that selectively connects the carrier CA2 of the second planetary gear set 24 to the sun gear S3 of the third planetary gear set 26 is provided between the carrier CA2 and the sun gear S3. The first brake B1 that selectively connects (holds) the carrier CA1 of the first planetary gear set 22 and the carrier CA3 of the third planetary gear set 26, that are connected together, to the housing 28 that is the non-rotating element is provided between these carriers CA1 (CA3) and the housing 28. The second brake B2 that selectively connects (holds) the ring gear R2 of the second planetary gear set 24 to the housing 28 is provided between the ring gear R2 and the housing 28.

FIG. 2 is an operation table showing the operating states of the engagement elements when selectively establishing a plurality of speeds in the automatic transmission 10, and shows both the gear ratio of each speed and the gear ratio step between speeds. The operation table in FIG. 2 summarizes the relationship between the speeds established in the automatic transmission 10 and the operating states of the clutches C and brakes B, with a circle indicating an engaged state and a blank space (i.e., an absence of a circle) indicating a released state. In this automatic transmission 10, any of eight forward gears (forward speeds), i.e., first gear "1st" to eighth gear "8th", and two reverse gears (reverse speeds), i.e., first reverse gear "Rev1" and second reverse gear "Rev2", is able to be established according to the combination of connection states of the sun gears S1, S2, and S3, the carriers CA1, CA2, and CA3, and the ring gears R1, R2, and R3 of the planetary gear sets 22, 24, and 26, that are the nine rotating elements provided in the automatic transmission 10, and the connection states of these rotating elements with respect to the housing 28, according to engagement and release of the clutches C and brakes B.

As shown in FIG. 2, in the automatic transmission 10, first gear "1st" having a gear ratio of 5.395 is established by engaging the second clutch C2, the fourth clutch C4, and the second brake B2. Second gear "2nd" having a gear ratio of 3.102 is established by engaging the second clutch C2, the third clutch C3, and the second brake B2. Third gear "3rd" having a gear ratio of 2.174 is established by engaging the second clutch C2, the third clutch C3, and the fourth clutch C4. Fourth gear "4th" having a gear ratio of 1.624 is established by engaging the first clutch C1, the second clutch C2, and the third clutch C3. Fifth gear "5th" having a gear ratio of 1.298 is established by engaging the first clutch C1, the second clutch C2, and the fourth clutch C4. Sixth gear "6th" having a gear ratio of 1.000 is established by engaging the first clutch C1, the third clutch C3, and the fourth clutch C4. Seventh gear "7th" having a gear ratio of 0.831 is established by engaging the first clutch C1, the fourth clutch C4, and the second brake B2. Eighth gear "8th" having a gear ratio of 0.746 is established by engaging the first clutch C1, the third clutch C3, and the second brake B2. First reverse gear "Rev1" having a gear ratio of 7.298 (−7.298) is established by engaging the fourth clutch C4, the first brake B1, and the second brake B2. Second reverse gear "Rev2" having a gear ratio of 2.941 (−2.941) is established by engaging the third clutch C3, the fourth clutch C4, and the first brake B1. A neutral state is established by releasing all of the clutches C and brakes B.

That is, in the automatic transmission 10, any of eight forward speeds, i.e., first gear "1st" to eighth gear "8th", and two reverse speeds, i.e., first reverse gear "Rev1" and second reverse gear "Rev2", is able to be selectively established by engaging any three elements and releasing the remaining three elements, from among the six engagement elements provided in the automatic transmission 10, that is, the four clutch elements, i.e., the first clutch C1 to the fourth clutch C4, and the two brake elements, i.e., the first brake B1 and the second brake B2. As shown in the rightmost column in FIG. 2, in the eight forward speeds of the first gear "1st" to the eighth gear "8th", the gear ratio step between speeds (i.e., the difference in the gear ratio between speeds) is within a range of 1.1 to 1.8, so it is evident that practical gear ratios that enable goods shifting with little shift shock to be realized are able to be obtained.

As is evident from the clutch and brake application chart in FIG. 2, switching (i.e., a simple shift) of the speeds in the automatic transmission 10 is performed by any one of the three elements that are engaged before the shift being released, and any one of the three elements that are released before the shift being engaged. For example, a shift from first gear to second gear is performed by the fourth clutch C4 being released and the third clutch C3 being engaged. That is, in the automatic transmission 10, at least in the forward speeds, so-called clutch-to-clutch shifting in which, for example, one engagement element involved in the shift is released while at the same time another engagement involved in the shift is engaged, is performed for all speed shifts except for skip shifts.

As is evident from the clutch and brake application chart in FIG. 2, in the automatic transmission 10, the first brake B1 is engaged when the reverse gears, i.e., the first reverse gear "Rev1" and the second reverse gear "Rev2", are established, but is released when the forward gears, i.e., the first gear "1st" to the eighth gear "8th", are established. In other words, the first brake B1 is only engaged when the reverse speeds, i.e., the first reverse gear "Rev1" and the second reverse gear "Rev2", are established, from among the eight forward speeds, i.e., the first gear "1st" to the eighth gear "8th", and the two reverse speeds, i.e., the first reverse gear "Rev1" and the second reverse gear "Rev2", that are the plurality of gears that are able to be established in the automatic transmission 10. That is, in the automatic transmission 10, the first brake B1 corresponds to a dedicated reverse engagement element.

Figure 3:
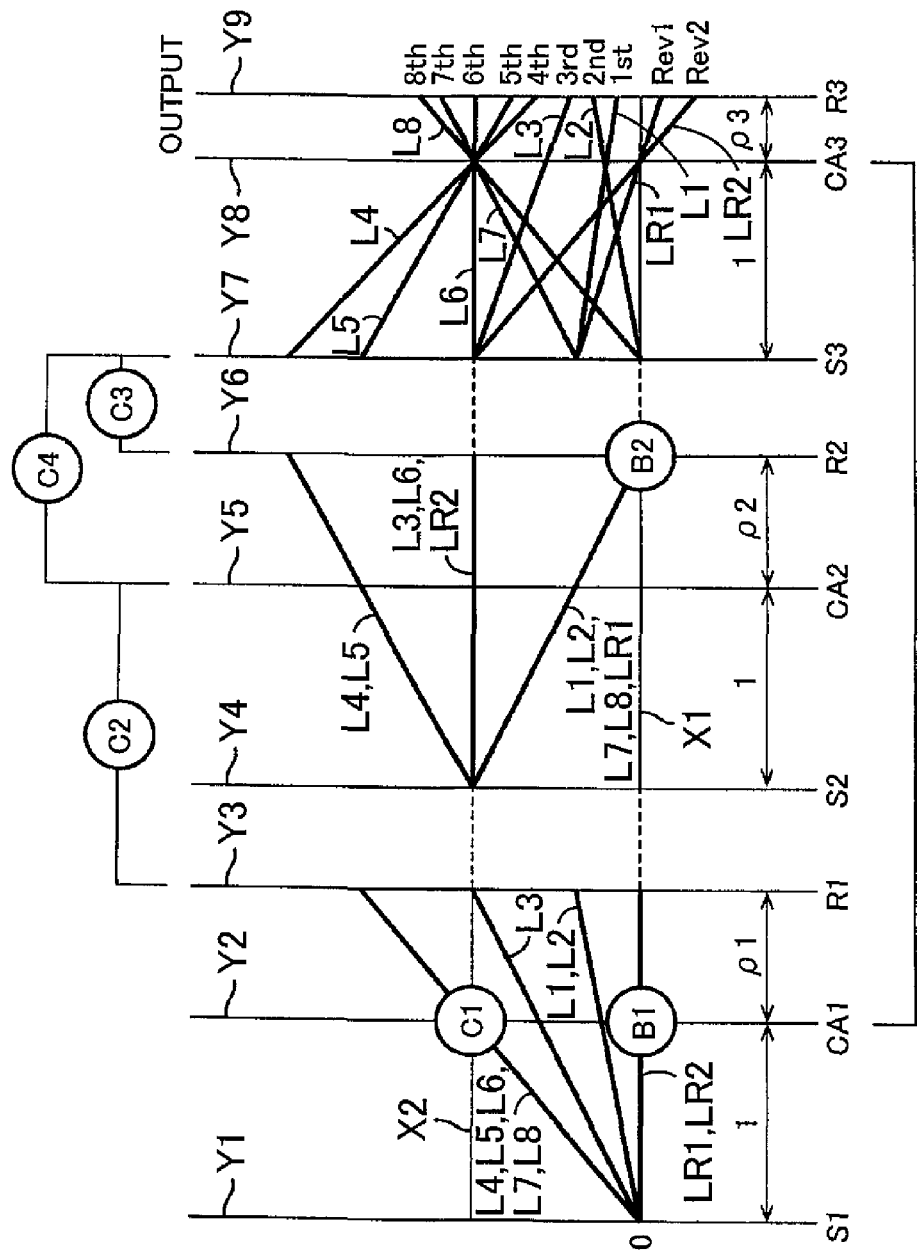
FIG. 3 is an alignment graph in which the correlations of rotating elements that are in different connection states in each speed are shown in straight lines, in the automatic transmission shown in FIG. 1.

FIG. 3 is an alignment graph in which the correlations of rotating elements that are in different connection states in each speed are shown in straight lines, in the automatic transmission 10 shown in FIG. 1. The alignment graph shown in FIG. 3 is a two-dimensional coordinate graph that shows the correlations of the gear ratios ρ of the planetary gear sets 22, 24, and 26 in the horizontal direction, and shows the relative rotation speeds in the vertical direction. The lower horizontal line X1 (the planetary gear sets are interconnected by broken lines; the same applies to X2) represents a rotation speed of zero. The upper horizontal line X2 represents a rotation speed of 1.0, i.e., the rotation speed N of the input shaft 12. Nine vertical lines Y1 to Y9 represent the relative rotation speeds of the rotating elements. More specifically, from left to right in the graph, line Y1 represents the sun gear S1 of the first planetary gear set 22 that is a first rotating element, line Y2 represents the carrier CA1 that is a second rotating element, line Y3 represents the ring gear R1 that is a third rotating element, line Y4 represents the sun gear S2 of the second planetary gear set 24 that is a fourth rotating element, line Y5 represents the carrier CA2 that is a fifth rotating element, line Y6 represents the ring gear R2 that is a sixth rotating element, line Y7 represents the sun gear S3 of the third planetary gear set 26 that is a seventh rotating element, line Y8 represents the carrier CA3 that is an eighth rotating element, and line Y9 represents the ring gear R3 that is a ninth rotating element. The intervals of the vertical lines Y1 to Y9 are determined according to the gear ratios ρ1, ρ2, and ρ3 of the planetary gear sets 22, 24, and 26. That is, for each of the vertical lines Y1 to Y3 corresponding to the three rotating elements of the first planetary gear set 22, the vertical lines Y4 to Y6 corresponding to the three rotating elements of the second planetary gear set 24, and the vertical lines Y7 to Y9 corresponding to the three rotating elements of the third planetary gear set 26, the ratio between the number of teeth on the sun gear S and the number of teeth on the carrier CA corresponds to 1, and the ratio between the number of teeth on the carrier CA and the number of teeth on the ring gear R corresponds to ρ.

In the alignment graph in FIG. 3, in the automatic transmission 10, the sun gear S2 that is the fourth rotating element is connected to the input shaft 12 that is the input member. The carrier CA1 that is the second rotating element and the carrier CA3 that is the eighth rotating element are connected together. The sun gear S1 that is the first rotating element is connected to the housing 28 that is the non-rotating member. The ring gear R3 that is the ninth rotating element is connected to the output gear 14 that is the output member. The carrier CA1 and the carrier CA3 that are connected together are selectively connected to the input shaft 12 via the first clutch C1, and selectively connected to the housing 28 via the first brake B1. The ring gear R1 that is the third rotating element is selectively connected to the carrier CA2 that is the fifth rotating element via the second clutch C2. The ring gear R2 that is the sixth rotating element is selectively connected to the sun gear S3 that is the seventh rotating element via the third clutch C3, and selectively connected to the housing 28 via the second brake B2. The carrier CA2 that is the fifth rotating element is selectively connected to the sun gear S3 that is the seventh rotating element via the fourth clutch C4.

As described above, the correlations of the rotation speeds of the rotating elements are set according to the engagement/release combinations of the clutches C and the brakes B when the speeds are established. In FIG. 3, the relationship corresponding to the first gear "1st" is represented by a straight line L1, the relationship corresponding to the second gear "2nd" is represented by a straight line L2, the relationship corresponding to the third gear "3rd" is represented by a straight line L3, the relationship corresponding to the fourth gear "4th" is represented by a straight line L4, the relationship corresponding to the fifth gear "5th" is represented by a straight line L5, the relationship corresponding to the sixth gear "6th" is represented by a straight line L6, the relationship corresponding to the seventh gear "7th" is represented by a straight line L7, the relationship corresponding to the eighth gear "8th" is represented by a straight line L8, the relationship corresponding to the first reverse gear "Rev1" is represented by a straight line LR1, and the relationship corresponding to the second reverse gear "Rev2" is represented by a straight line LR2. In the alignment graph in FIG. 3, in order to show the correlations of the rotation speeds of the rotating elements related to all of the speeds that are able to be established in the automatic transmission 10 in one drawing, the straight lines L1 to L8, LR1, and LR2 are not always linear between the planetary gear sets 22, 24, and 26. However, the relative rotation speeds of the nine rotating elements of the automatic transmission 10 at each speed are all able to be shown because the rotation speeds of the rotating elements of the planetary gear sets 22, 24, and 26 are shown equally according to the engagement of the clutches C and the brakes B. This is also true for the description of the alignment graph below.

That is, in the alignment graph in FIG. 3, the rotation speeds indicated by the vertical line Y2 and the vertical line Y8 that correspond to the second rotating element (CA1) and the eighth rotating element (CA3) that are connected together are the same for all of the speeds. Moreover, the nine rotating elements of the automatic transmission 10 are selectively connected by engaging the clutches C, so the rotation speeds of the rotating elements that are connected together are the same. For example, as shown in the clutch and brake application chart in FIG. 2, in first gear "1st" to fifth gear "5th", the second clutch C2 is engaged, so the third rotating element (R1) and the fifth rotating element (CA2) are connected together. Accordingly, for the straight line L1 corresponding to first gear "1st", the straight line L2 corresponding to second gear "2nd", the straight line L3 corresponding to third gear "3rd", the straight line L4 corresponding to fourth gear "4th", and the straight line L5 corresponding to fifth gear "5th", the points of intersection with the vertical line Y3 corresponding to the third rotating element (R1) and the points of intersection with the vertical line Y5 corresponding to the fifth rotating element (CA2) are the same in the vertical direction.

As shown in FIG. 3, in the automatic transmission 10, the rotation speed of the output gear 14 in first gear "1st" is indicated by the point of intersection between the straight line L1 determined by the second clutch C2, the fourth clutch C4, and the second brake B2 being engaged, and the vertical line Y9 that represents the rotation speed of the ring gear R3 that is connected to the output gear 14 that is the output member. The rotation speed of the output gear 14 in second gear "2nd" is indicated by the point of intersection between the straight line L2 determined by the second clutch C2, the third clutch C3, and the second brake B2 being engaged, and the vertical line Y9. The rotation speed of the output gear 14 in third gear "3rd" is indicated by the point of intersection between the straight line L3 determined by the second clutch C2, the third clutch C3, and fourth clutch C4 being engaged, and the vertical line Y9. The rotation speed of the output gear 14 in fourth gear "4th" is indicated by the point of intersection between the straight line L4 determined by the first clutch C1, the second clutch C2, and the third clutch C3 being engaged, and the vertical line Y9. The rotation speed of the output gear 14 in fifth gear "5th" is indicated by the point of intersection between the straight line L5 determined by the first clutch C1, the second clutch C2, and the fourth clutch C4 being engaged, and the vertical line Y9. The rotation speed of the output gear 14 in sixth gear "6th" is indicated by the point of intersection between the straight line L6 determined by the first clutch C1, the third clutch C3, and the fourth clutch C4 being engaged, and the vertical line Y9. The rotation speed of the output gear 14 in seventh gear "7th" is indicated by the point of intersection between the straight line L7 determined by the first clutch C1, the fourth clutch C4, and the second brake B2 being engaged, and the vertical line Y9. The rotation speed of the output gear 14 in eighth gear "8th" is indicated by the point of intersection between the straight line L8 determined by the first clutch C1, the third clutch C3, and the second brake B2 being engaged, and the vertical line Y9. The rotation speed of the output gear 14 in the first reverse gear "Rev1" is indicated by the point of intersection between the straight line LR1 determined by the fourth clutch C4, the first brake B1, and the second brake B2 being engaged, and the vertical line Y9. The rotation speed of the output gear 14 in the second reverse gear "Rev2" is indicated by the point of intersection between the straight line LR2 determined by the third clutch C3, the fourth clutch C4, and the first brake B1 being engaged, and the vertical line Y9.

Continuing on, other example embodiments of the invention will be described in detail with reference to the drawings. In the description below, portions common to the first example embodiment described above will be denoted by like reference characters and descriptions of those portions will be omitted.

Figure 4:
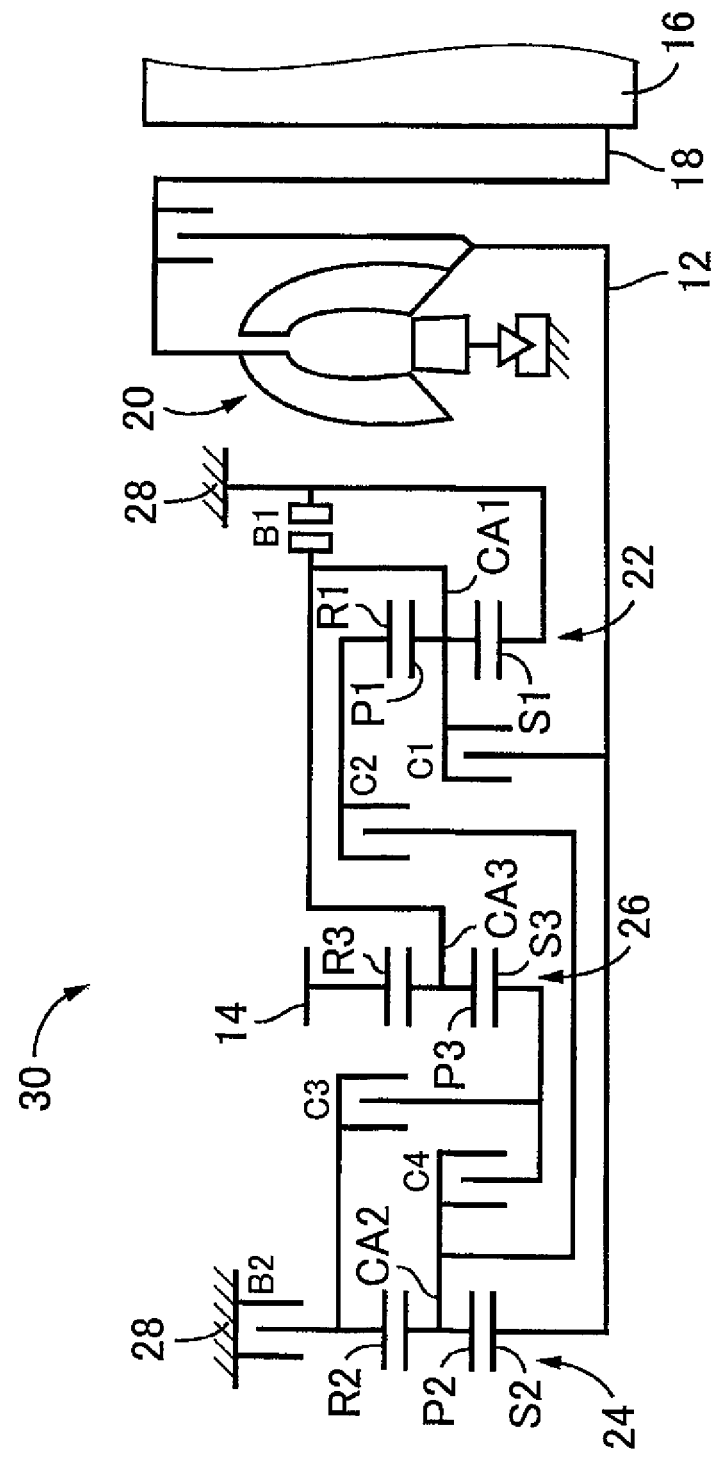
FIG. 4 is a skeleton view of the structure of a vehicular automatic transmission according to a second example embodiment of the invention.

FIG. 4 is a skeleton view of the structure of a vehicular automatic transmission 30 according to a second example embodiment of the invention. Instead of the first brake B1 that is a hydraulic friction engagement device, a mesh-type first brake B1 is provided as a dedicated reverse engagement element that selectively connects (holds) the carrier CA1 of the first planetary gear set 22 and the carrier CA3 of the third planetary gear set 26, that are connected together, to the housing 28 in the automatic transmission 30 shown in FIG. 4. This first brake B1 is preferably a mesh engagement device (a dog clutch) that includes a pair of engaging members having pawl portions that are able to be engaged together, corresponding to a pair of members to be engaged (in which relative rotation is prohibited) and released (in which relative rotation is allowed), i.e., the carriers CA1 (CA3) and the housing 28, and in which the engagement state is switched by moving the pairs of engaging members relatively according to hydraulic pressure supplied from a hydraulic circuit. The first brake B1 is preferably provided with a cylinder, a piston reciprocatably provided inside the cylinder, and a spring that urges the piston to disengage the pawl portions, for example, and is a normally-open type engagement device that is released by the piston being moved by the urging force of the spring in the direction to disengage the pawl portions when hydraulic pressure is not being supplied, and that is engaged by the piston being moved against the urging force of the spring in the direction to engage the pawl portions when hydraulic pressure is being supplied. Alternatively, the first brake B1 may be a normally-closed type engagement device that is engaged when hydraulic pressure is not being supplied, and that is released when hydraulic pressure is being supplied.

Figure 5:
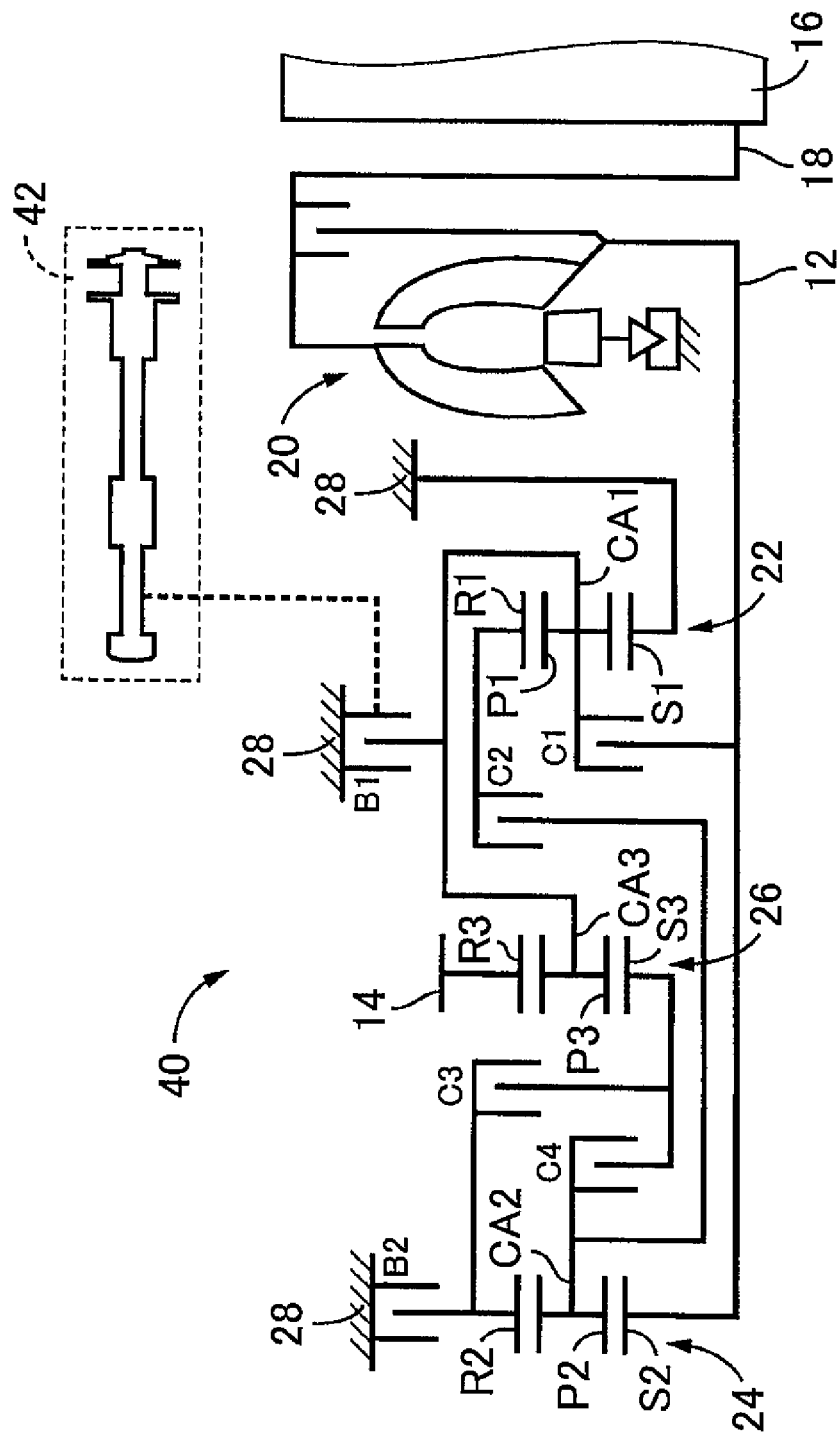
FIG. 5 is a skeleton view of the structure of a vehicular automatic transmission according to a third example embodiment of the invention.

FIG. 5 is a skeleton view of the structure of a vehicular automatic transmission 40 according to a third example embodiment of the invention. In the automatic transmission 40 shown in FIG. 5, the first brake B1 that serves as a dedicated reverse engagement element is mechanically connected a manual valve 42 that serves as a manual mechanism, and is configured to switch between an engaged state and a released state in conjunction with this manual valve 42 being driven. The manual valve 42 is configured such that the position of a valve body of the manual valve 42 switches in response to a manual shaft, not shown, being driven according to a shift operation of a shift operating device provided near a driver's seat, for example. That is, the first brake B1 may be said to be mechanically connected to a manual shaft that serves as a manual mechanism. This mechanical connection may be a physical connection by a wire mechanism or the like, or it may be a connection in which hydraulic pressure is directly supplied from the manual valve 42 to an actuator that corresponds to the first brake B1. The first brake B1 is preferably configured to be engaged when an operation for establishing reverse running is performed in the manual mechanism. For example, the first brake B1 is configured to engage in conjunction with an operation in which the position of the valve body of the manual valve 42 is switched to a position corresponding to reverse running by the manual shaft being driven in response to a shift operation for establishing reverse running being performed by the shift operating device. In this structure, the first brake B1 may be a hydraulic friction engagement device, or may be a mesh engagement device. Alternatively, the first brake B1 may be a band type engagement device, or may have a structure similar to that of a so-called parking lock mechanism that is engaged (i.e., locked) by a manual shaft being driven when a shift operating device is switched to a stopped position, that is provided between the carriers CA1 (CA3) and the housing 28.

In this way, in the first to the third example embodiments described above, the first brake B1 that is one engagement element from among the plurality of engagement elements, i.e., the clutches C and the brakes B, is a dedicated reverse engagement element that is engaged when a reverse gear is established and is released when a forward gear is established. Providing an engagement element that does not contribute to a shift related to a forward gear in this way obviates the need for a structure for realizing slip control or the like to partially engage the engagement element, and thus enables the structure of the hydraulic circuit to be simplified. That is, the vehicle automatic transmissions 10, 30, and 40 having a high degree of freedom in structure are able to be provided.

The plurality of engagement elements includes the four clutch elements, i.e., the first clutch C1, the second clutch C2, the third clutch C3, and the fourth clutch C4, and the two brake elements, i.e., the first brake B1, and the second brake B2. Having fewer brake elements than clutch elements in this way enables drag loss when an engagement element is released to be even better suppressed.

Each of the vehicular automatic transmissions 10, 30, and 40 includes the single pinion first planetary gear set 22, the single pinion second planetary gear set 24, the single pinion third planetary gear set 26, the first clutch C1 that selectively connects the carrier CA1 of the first planetary gear set 22 and the carrier CA3 of the third planetary gear set 26, that are connected together, to the input shaft 12 that is the input member, the second clutch C2 that selectively connects the ring gear R1 of the first planetary gear set 22 to the carrier CA2 of the second planetary gear set 24, the third clutch C3 that selectively connects the ring gear R2 of the second planetary gear set 24 to the sun gear S3 of the third planetary gear set 26, the fourth clutch C4 that selectively connects the carrier CA2 of the second planetary gear set 24 to the sun gear S3 of the third planetary gear set 26, the first brake B1 that selectively connects the carrier CA1 of the first planetary gear set 22 and the carrier CA3 of the third planetary gear set 26, that are connected together, to the housing 28 that is the non-rotating member, and the second brake B2 that selectively connects the ring gear R2 of the second planetary gear set 24 to the housing 28. Moreover, in each of vehicular automatic transmissions 10, 30, and 40, the sun gear S2 of the second planetary gear set 24 is connected to the input shaft 12, the sun gear S1 of the first planetary gear set 22 is connected to the housing 28, the carrier CA1 of the first planetary gear set 22 and the carrier CA3 of the third planetary gear set 26 are connected together, and the ring gear R3 of the third planetary gear set 26 is connected to the output gear 14 that is the output member. Therefore, the vehicle automatic transmissions 10, 30, and 40 of practical modes having a high degree of freedom in structure are able to be provided.

In the automatic transmission 30 according to the second example embodiment described above, the dedicated reverse engagement element is the first brake B1 that is a mesh engagement element, so drag loss when an engagement element is released is able to be better suppressed.

In the automatic transmission 40 according to the third example embodiment described above, the dedicated reverse engagement element is mechanically connected to the manual valve 42 that is a mechanical mechanism, and is configured to switch between an engaged state and a released state in conjunction with the manual valve 42 being driven. As a result, the structure of the hydraulic circuit is able to be simplified even more.

While the invention has been described with reference to example embodiments thereof, it should be understood that the invention is not limited to the example embodiments. That is, the invention may be carried out in modes that have been modified in any of a variety of ways without departing from the scope thereof.

What is claimed is:

1. A vehicular automatic transmission comprising:
   three single pinion planetary gear sets; and
   a plurality of engagement elements, a plurality of gears being selectively established by three of the plurality of engagement elements being engaged and three of the plurality of engagement elements being released, and one of the plurality of engagement elements being a dedicated reverse engagement element that is engaged when a reverse gear is established and is released when a forward gear is established,
   wherein the plurality of engagement elements is four clutch elements and two brake elements,
   wherein the three single pinion planetary gear sets are a first planetary gear set, a second planetary gear set, and a third planetary gear set;
   the four clutch elements are a first clutch element, a second clutch element, a third clutch element, and a fourth clutch element;
   the two brake elements are a first brake element and a second brake element;
   a carrier of the first planetary gear set and a carrier of the third planetary gear set are connected together;
   the first clutch element selectively connects the carrier of the first planetary gear set and the carrier of the third planetary gear set to an input member;
   the second clutch element selectively connects a ring gear of the first planetary gear set to a carrier of the second planetary gear set;
   the third clutch element selectively connects a ring gear of the second planetary gear set to a sun gear of the third planetary gear set;
   the fourth clutch element selectively connects the carrier of the second planetary gear set to the sun gear of the third planetary gear set;
   the first brake element selectively connects the carrier of the first planetary gear set and the carrier of the third planetary gear set to a non-rotating member;
   the second brake element selectively connects the ring gear of the second planetary gear set to the non-rotating member;
   a sun gear of the second planetary gear set is connected to the input member;
   a sun gear of the first planetary gear set is connected to the non-rotating member; and
   a ring gear of the third planetary gear set is connected to an output member.

2. The automatic transmission according to claim 1, wherein the dedicated reverse engagement element is a mesh engagement element.

3. The automatic transmission according to claim 1, wherein the dedicated reverse engagement element is mechanically connected to a manual mechanism, and is configured to switch between an engaged state and a released state in conjunction with the manual mechanism being driven.

* * * * *